United States Patent
Sata

(10) Patent No.: US 9,002,597 B2
(45) Date of Patent: Apr. 7, 2015

(54) AUTOMOBILE PADDLE SHIFTERS WITH SECONDARY PADDLES

(71) Applicant: Toyota Motor Engineering & Manufacturing North America, Inc., Erlanger, KY (US)

(72) Inventor: Andrew Sata, Gardena, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 242 days.

(21) Appl. No.: 13/662,322

(22) Filed: Oct. 26, 2012

(65) Prior Publication Data

US 2014/0121913 A1    May 1, 2014

(51) Int. Cl.
*G06F 17/00* (2006.01)
*B60K 20/06* (2006.01)

(52) U.S. Cl.
CPC ........... *B60K 20/06* (2013.01); *Y10T 74/20146* (2015.01)

(58) Field of Classification Search
CPC .. F16H 61/0248; F16H 61/0213; F16H 61/16
USPC .................. 701/51, 52, 55–58; 280/238, 191
See application file for complete search history.

(56) References Cited

U.S. PATENT DOCUMENTS

| | | |
|---|---|---|
| RE31,451 E | 11/1983 | Osborn |
| 4,574,661 A | 3/1986 | Opperud et al. |
| 5,029,680 A | 7/1991 | Kobayashi et al. |
| 5,050,079 A | 9/1991 | Steeby |
| 5,335,743 A | 8/1994 | Gillbrand et al. |
| 5,425,686 A | 6/1995 | Grange |
| 5,456,333 A | 10/1995 | Brandt et al. |
| 6,076,414 A | 6/2000 | Tabata et al. |
| 6,109,126 A | 8/2000 | Cochran et al. |
| 6,144,911 A * | 11/2000 | Binz et al. ........................ 701/51 |
| 6,525,283 B2 | 2/2003 | Leng |
| 6,555,928 B1 | 4/2003 | Mizuno et al. |
| 6,773,369 B2 | 8/2004 | Altenkirch et al. |
| 6,939,266 B2 | 9/2005 | Koerner et al. |

(Continued)

FOREIGN PATENT DOCUMENTS

| | | |
|---|---|---|
| GB | 2435678 | 9/2007 |
| GB | 2473294 | 3/2011 |

(Continued)

OTHER PUBLICATIONS

"Can Capable Shift Selectors"; www.arrens.com/products/bywireshift/cancapable.cfm; 1 page; May 13, 2012.

(Continued)

*Primary Examiner* — Mary Cheung
(74) *Attorney, Agent, or Firm* — Snell & Wilmer LLP

(57) ABSTRACT

A system for controlling gear changes in a vehicle. The system may include at least one primary paddle shifter coupled to the steering wheel and/or the steering column. The system also includes at least one auxiliary paddle shifter coupled to the steering wheel, the steering column and/or the at least one primary paddle shifter. The primary paddle shifter may engage a primary function, such as one sequential gear shift up or down and the auxiliary paddle shifter may engage a secondary function, such as an optimal gear shift up or down.

20 Claims, 5 Drawing Sheets

(56) References Cited

U.S. PATENT DOCUMENTS

| | | | |
|---|---|---|---|
| 6,962,552 B2 | 11/2005 | Sakamoto et al. | |
| 6,978,691 B2 | 12/2005 | Katakura | |
| 7,182,710 B2 | 2/2007 | Surampudi | |
| 7,278,510 B1 | 10/2007 | Richards | |
| 7,367,420 B1 | 5/2008 | Sherrod et al. | |
| 7,470,212 B2 | 12/2008 | Inagaki et al. | |
| 7,470,213 B2 | 12/2008 | Matsudaira et al. | |
| 7,555,967 B2 | 7/2009 | Terayama et al. | |
| 7,563,189 B2 | 7/2009 | Inuta | |
| 7,597,021 B2 | 10/2009 | Nishio et al. | |
| 7,603,924 B2 | 10/2009 | Mandou et al. | |
| 7,678,005 B2 | 3/2010 | Tuckfield | |
| 7,704,187 B2 | 4/2010 | Saito et al. | |
| 7,717,823 B2 | 5/2010 | Balamucki et al. | |
| 7,774,118 B2 | 8/2010 | Hata et al. | |
| 7,819,776 B2 | 10/2010 | Toi et al. | |
| 7,841,254 B2 | 11/2010 | Ho | |
| 7,845,457 B2 | 12/2010 | Baluch et al. | |
| 8,021,268 B2 | 9/2011 | Sawada | |
| 8,055,414 B2 | 11/2011 | Tawara | |
| 8,063,324 B2 | 11/2011 | Sakai et al. | |
| 8,133,152 B2 | 3/2012 | Iwao et al. | |
| 8,135,521 B2 | 3/2012 | Sugiura et al. | |
| 8,186,241 B2 | 5/2012 | Sickart | |
| 2007/0157757 A1* | 7/2007 | Trevino et al. | 74/519 |
| 2007/0293367 A1 | 12/2007 | Trevino et al. | |
| 2008/0021609 A1 | 1/2008 | Derby et al. | |
| 2008/0077297 A1* | 3/2008 | Ito et al. | 701/48 |
| 2008/0182718 A1 | 7/2008 | Ido et al. | |
| 2008/0221760 A1 | 9/2008 | Wakamatsu et al. | |
| 2009/0200761 A1 | 8/2009 | Stevens | |
| 2009/0218160 A1* | 9/2009 | Baluch et al. | 180/336 |
| 2009/0270223 A1 | 10/2009 | Cook | |
| 2010/0175499 A1 | 7/2010 | Thomas et al. | |
| 2010/0305823 A1 | 12/2010 | Kitaori et al. | |
| 2011/0005492 A1 | 1/2011 | Takeuchi et al. | |
| 2011/0011196 A1 | 1/2011 | Cable | |
| 2011/0130928 A1 | 6/2011 | Matsunaga et al. | |
| 2011/0132120 A1 | 6/2011 | Skogward | |
| 2011/0160969 A1 | 6/2011 | Oguri et al. | |
| 2011/0224878 A1 | 9/2011 | Nakamura et al. | |
| 2011/0295475 A1 | 12/2011 | Shimizu et al. | |
| 2012/0059556 A1 | 3/2012 | Tanaka et al. | |
| 2012/0144947 A1 | 6/2012 | Herbert et al. | |
| 2012/0166053 A1* | 6/2012 | Nishida et al. | 701/52 |
| 2012/0204668 A1 | 8/2012 | Zito et al. | |
| 2012/0221200 A1* | 8/2012 | Golomb | 701/36 |

FOREIGN PATENT DOCUMENTS

| | | |
|---|---|---|
| JP | 2002254953 | 9/2002 |
| JP | 2003118417 | 4/2003 |
| JP | 2005104423 | 4/2005 |
| JP | 2006022913 | 1/2006 |
| JP | 2007069634 | 3/2007 |
| JP | 2008115975 | 5/2008 |
| JP | 2009192047 | 8/2009 |
| JP | 2010047138 | 3/2010 |
| JP | 2011063260 | 3/2011 |

OTHER PUBLICATIONS

"MasterShift, Paddleshiftng the Future"; mastershif.com/p_street_manual.htm; 2 pages; copyright 2004.

"Shift, Integrated Electronic Safe Shifting System"; www.altronicsinc.com/pages/shift/html; 4 pages; copyright 2011.

"Shrifter Paddle Shifter"; twistmachine.com/shopping; 2 pages; copyright 2012.

Electro-Pneumatic Systems for Formula SAE Application; USC Racing; http: uscracing.wikispaces.com/Electro-Pneumatic+Shifting; 6 pages; printed on Mar. 8, 2013.

Electric Gearshift Actuator; Magneti Marelli S.p.A.; 2 pages; Nov. 2009.

* cited by examiner

AUTOMOBILE PADDLE SHIFTERS WITH SECONDARY PADDLES

FIELD

The present disclosure relates to paddle shifters, and more particularly, to a paddle shifter with at least one auxiliary paddle shifter position having a second function that is different from the first function of the primary paddle shifter.

BACKGROUND

Paddle shifters are generally mounted behind or to a steering wheel (or a steering column) of a vehicle to allow the driver to make a manual single sequential gear shift up or down of the vehicle. Locating the paddle shifters near the steering wheel or the steering column makes it easier for the driver to make manual gear changes without having to take his or her hands off the steering wheel. This increases the driver's control of the vehicle while still allowing the driver to have an enjoyable driving experience.

A paddle shift equipped steering wheel generally has two paddle shifters—one on the right side of the steering wheel and one on the left side of the steering wheel. Each paddle shifter is actuated by either pushing a lever away from or pulling a lever towards the driver. Each paddle shifter is assigned to only one paddle actuation function. That is, depending on the vehicle make and model, one paddle shifter controls a single upshift in gear and one paddle shifter controls a single downshift in gear. In certain instances or situations, the driver may apply the paddle shifter in an inefficient manner and/or need to step multiple gears using a like number of multiple distinct actions to effect a desired gear change.

SUMMARY

The present disclosure relates to paddle shifters, and more particularly, to a paddle shifter with a primary paddle shifter having a first function and an auxiliary paddle shifter having a secondary function that is different from the first function (or primary function). In various embodiments, the system controls gear changes in a vehicle. The system includes a steering wheel. The system also includes at least one primary paddle shifter coupled to the steering wheel and/or the steering column, the paddle shifter has an idle position with no associated function when the paddle shifter is in the idle location, a first operating position with an associated first function when the paddle shifter is in the first location, and a second operating position with an associated second function when the paddle shifter is in the second location. The system also includes at least one auxiliary paddle shifter coupled to the steering wheel, the steering column and/or the primary paddle shifter, the auxiliary paddle shifter has an idle position with no associated function when the auxiliary paddle shifter is in the idle location, a first operating position with an associated third function when the auxiliary paddle shifter is in the first location, and a second operating position with an associated fourth function when the auxiliary paddle shifter is in the second location. The first function, the second function, the third function, and the fourth function are each different functions.

BRIEF DESCRIPTION OF THE DRAWINGS

The features and advantages of the embodiments of the present disclosure will become more apparent from the detailed description set forth below when taken in conjunction with the drawings. Naturally, the drawings and their associated descriptions illustrate example arrangements within the scope of the claims and do not limit the scope of the claims. Reference numbers are reused throughout the drawings to indicate correspondence between referenced elements.

DETAILED DESCRIPTION

Figure 1:
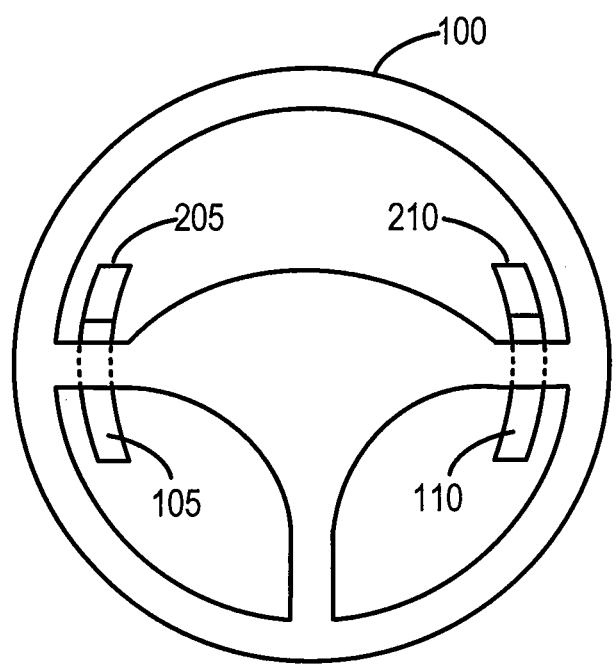
FIG. 1 depicts a partial front view of an automobile steering wheel with paddle shifters according to various embodiments.

In the following detailed description, numerous specific details are set forth to provide an understanding of the present disclosure. It will be apparent, however, to one of ordinarily skilled in the art that elements of the present disclosure may be practiced without some of these specific details. In other instances, well-known structures and techniques have not been shown in detail to avoid unnecessarily obscuring the present disclosure.

A semi-automatic transmission (also known as automated transmission, self-changing transmission, clutch-less manual transmission, automated manual transmission, flappy-paddle gearbox, or paddle-shift gearbox) is an automobile transmission that does not change gears automatically, but rather facilitates manual gear changes by dispensing with the need to press a clutch pedal at the same time as changing gears. It may use electronic sensors, pneumatics, processors and actuators to execute gear shifts on the command of the driver and/or by a computer. This removes the need for a clutch pedal which the driver otherwise needs to depress before making a gear change, since the clutch itself is actuated by electronic equipment which can substantially synchronize the timing and torque required to make quick, smooth gear shifts.

The ability to shift gears manually, often via paddle shifters, can also be found on certain automatic transmissions (manumatics such as Tiptronic) and continuous variable transmissions (CVTs) (such as Lineartronic). Various aspects of the present disclosure may be applicable to these automatic transmissions.

A sensor, such as a Hall Effect sensor, may sense the direction of a requested shift, and this input, together with a sensor in the gear box which senses the current speed and gear selected, feeds into a central processing unit. This central processing unit then determines the optimal timing and torque required for a smooth clutch engagement, based on input from these two sensors as well as other factors, such as engine rotation, electronic stability control, ECU, air conditioner and dashboard instruments.

At times, it may be beneficial to add additional functionality to the shifting capabilities of the vehicle paddle shifter such as through primary paddle shifters 105 and 110 and auxiliary paddle shifters 205 and 210. According to various exemplary embodiments and with reference to FIG. 1, a partial front view of an automobile steering wheel 100 with the primary paddle shifters 105 and 110 and the auxiliary paddle shifters 205 and 210 is depicted. As shown, a left primary paddle shifter 105 is attached to or coupled to the steering wheel 100 and/or a steering column 200 and is used to downshift the vehicle's transmission by at least one (1) gear per each pull of the left primary paddle shifter 105. A right primary paddle shifter 110 is attached to or coupled to the steering wheel 100 and/or the steering column 200 and is used to upshift the vehicle's transmission by at least one (1) gear per each pull of the right primary paddle shifter 110. Alternatively, the left primary paddle shifter 105 can be used to upshift the vehicle's transmission by at least one (1) gear per each pull of the left primary paddle shifter 105 and the right primary paddle shifter 110 can be used to downshift the vehicle's transmission by at least one (1) gear per each pull of the right primary paddle shifter 110.

According to various embodiments, either the right primary paddle shifter 110 or the left primary paddle shifter 105 may be used to upshift or downshift the vehicle's transmission per each pull or push of each primary paddle shifter. For example, a pull on either the primary paddle shifter 105 or 110 may affect or result in a downshift, while a push on either the primary paddle shifter 105 or 110 may affect or result in an upshift. Conversely, according to various embodiments, a push on either the primary paddle shifter 105 or 110 may result in a downshift, while a pull on either the primary paddle shifter 105 or 110 may result in an upshift.

As shown, a left auxiliary paddle shifter 205 is attached to or coupled to the steering wheel 100 and/or the steering column 200 and is used to engage a secondary function, such as to downshift the vehicle's transmission by an optimal gear shift per each pull of the left auxiliary paddle shifter 205. A right auxiliary paddle shifter 210 is attached to or coupled to the steering wheel 100 and/or steering column 200 and is used to engage a secondary function, such as an upshift the vehicle's transmission by an optimal gear shift per each pull of the right auxiliary paddle shifter 210. Alternatively, the left auxiliary paddle shifter 205 can be used to engage a secondary function, such as to upshift the vehicle's transmission by an optimal gear shift per each pull of the left auxiliary paddle shifter 205 and the right auxiliary paddle shifter 210 can be used to engage a secondary function, such as to downshift the vehicle's transmission by an optimal gear shift per each pull of the right auxiliary paddle shifter 210. The primary paddle shifter 105 and 110 and/or the auxiliary paddle shifter 205 and 210 may be marked with an indicator for the user to understand their respective operational capabilities. For example, a small display screen can be placed on or embedded into each paddle shifter so the driver can view it and the display can show or indicate their respective operational capabilities (e.g., upshift (+), downshift (−), etc.).

According to various embodiments, the right primary paddle shifter 110 may be used to upshift or downshift the vehicle's transmission by at least one (1) gear per each pull or push of the right primary paddle shifter 110 and the left primary paddle shifter 105 which may impart the functionality of the left auxiliary paddle shifter 205 (described herein) may be used to engage a secondary function, such as an optimal upshift or downshift of the vehicle's transmission per each pull or push of the left primary paddle shifter 105. Conversely, according to various embodiments, the left primary paddle shifter 105 may be used to upshift or downshift the vehicle's transmission by at least one (1) gear per each pull or push of the left primary paddle shifter 105 and the right primary paddle shifter 110 (which may impart the functionality of right auxiliary paddle shifter 210 described herein) may be used to engage a secondary function, such as an optimal upshift or downshift of the vehicle's transmission per each pull or push of the right primary paddle shifter 110.

Figure 2:
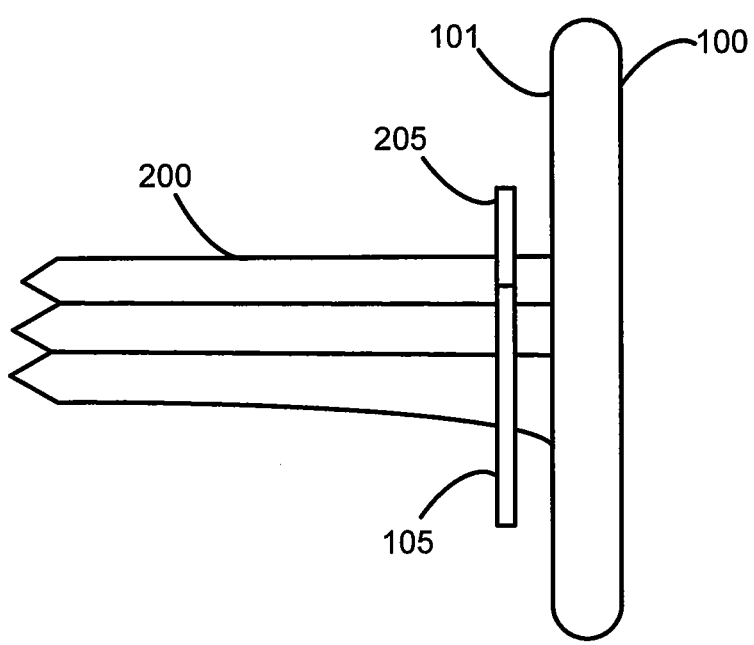
FIG. 2 depicts a left side view of the automobile steering wheel of FIG. 1 showing the left paddle shifter connected to a rear portion of the automobile steering wheel and a steering column according to various embodiments.

FIG. 2 depicts a left side view of the automobile steering wheel 100 of FIG. 1 showing the left primary paddle shifter 105 and the left auxiliary paddle shifter 205 connected to a rear portion 101 of the automobile steering wheel 100 and/or a steering column 200 according to various embodiments. The right primary paddle shifter 110 is also connected to the rear portion 101 of the automobile steering wheel 100 and/or the steering column 200. Similarly, the right primary paddle shifter 110 and the right auxiliary paddle shifter 210 may also be connected to the rear portion 101 of the automobile steering wheel 110 and/or the steering column 200. Referring to FIGS. 1 and 2, since the left and right primary paddle shifters 105 and 110 are connected to the automobile steering wheel 100, the left and right primary paddle shifters 105 and 110 rotate with the steering wheel 100 when the steering wheel 100 is rotated in the clockwise and counterclockwise directions. Similarly, since the left and right auxiliary paddle shifters 205 and 210 are connected to the automobile steering wheel 100, the left and right auxiliary paddle shifters 205 and 210 also rotate with the steering wheel 100 when the steering wheel 100 is rotated in the clockwise and counterclockwise directions.

For illustrative purposes, the primary paddle shifter 105 will be referred to as the left primary paddle shifter; however, one skilled in the art will know that the term "left" can be replaced with or used in conjunction with the term "right" depending on the structure, features and functions being described or shown. A connector which may be made of any material such as metal, plastic, and/or composite may be used to connect the left primary paddle shifter 105 to the rear portion 101 of the steering wheel 100. The connector may include a rod, a hinge, a spring and/or a ball and socket connection to allow the left primary paddle shifter 105 to be connected to the rear portion 101 of the steering wheel 100. For example, the connector may include a hinge to allow the left primary paddle shifter 105 to move to a location or position and a spring to keep a force on the primary paddle shifter 105 so that when the driver releases the paddle shifter 105, the primary paddle shifter 105 automatically returns to its idle location or position. According to various embodiments, the auxiliary paddle shifter 205 may be moved in concert with the primary paddle shifter 105 or moved independent of the primary paddle shifter 105. Similarly, according to various embodiments, the auxiliary paddle shifter 210 may be moved in concert with the primary paddle shifter 110 or moved independent of the primary paddle shifter 110.

A system 300 for controlling gear changes in a vehicle is disclosed. The system 300 includes the steering wheel 100, the primary paddle shifters 105 and 110, and the auxiliary paddle shifters 205 and 210. According to various embodiments, there may be a first location 220 corresponding to a pull direction towards the steering wheel 100 of the vehicle and a second location 225 corresponding to a push direction away from the steering wheel 100 with respect to either or both the primary paddle shifters 105 and 110. There may also be a third location 320 corresponding to a pull direction towards the steering wheel 100 of the vehicle and a fourth location 325 corresponding to a push direction away from the steering wheel 100 with respect to either or both the auxiliary paddle shifters 205 and 210.

According to exemplary embodiments, the optimal gear upshift or downshift generally includes skipping of one or more gears and/or progressing through one or more gears in sequence in order to maximize fuel efficiency or maximize acceleration or performance. For example, the optimal downshift may include maximizing acceleration performance to optimally utilize engine performance. Also, for example, the optimal upshift may maximize fuel economy, such as by reducing engine speed at a given vehicle speed. In an exemplary embodiment, engine speed may be reduced as much as possible at each given vehicle speed. The movement of the paddle shifters 105, 110, 205, and 210 may be communicated to a processor and/or a memory.

The processor or electronic control unit (ECU) may read a software map or table to determine the appropriate gear or gear shift for the vehicle based on one or more of the following: (1) drive mode (i.e., economy mode, sport mode, normal mode), (2) vehicle speed, and/or (3) current gear. Therefore, a primary paddle shifter 105 and 110 movement can be used for a single gear shift by pulling or pushing the primary paddle shifter 105 and 110 to engage or be at the first position or the second position and an auxiliary paddle shifter movement 205 and 210 (with or without a primary paddle shifter 105 and 110 movement) can be used for multiple gear shifts by pulling or pushing the auxiliary paddle shifter 205 and 210 to engage or be at the third position or the fourth position. In one embodiment, moving the auxiliary paddle shifter 205 and 210 from the idle location 215 to the third location requires a different amount of effort or force than moving the primary paddle shifter 105 and 110 from the idle location 215 to the second location 225, such as more force than or less force than moving the primary paddle shifter 105 and 110 from the idle location 215 to the second location 225. According to various embodiments, substantially equal effort may be used to actuating either the primary or secondary paddles.

According to various embodiments, the primary paddle shifters 105 and 110 may have an idle position 215 with no associated function when the primary paddle shifters 105 and 110 are in the idle location 215, a first operating position with an associated first function when the primary paddle shifters 105 and 110 are in the first location 220, and/or a second operating position with an associated second function when the primary paddle shifters 105 and 110 are in the second location 225. The associated first function is different from the associated second function. For example, the associated first function can be a gear shift of only 1 gear (either up or down) and the associated second function can be a gear shift of only 1 gear (either up or down). For instance, the left primary paddle shifter 105 may perform a gear shift of only 1 gear down while the right paddle shifter 110 may perform a gear shift of only 1 gear up.

A system having two positions per paddle (e.g., idle and pull or idle and push) is an embodiment of the present invention. According to various embodiments, the auxiliary paddle shifters 205 and 210 may also have an idle position with no associated function when the auxiliary paddle shifters 205 and 210 are in the idle location 215, a third operating position with an associated third function when the auxiliary paddle shifters 205 and 210 are in the third location, and a fourth operating position with an associated fourth function when the auxiliary paddle shifters 205 and 210 are in the fourth location 225. The third and fourth functions may be a shift of 2 or more gears (either up or down) either by skipping gears or sequentially progressing through 2 or more gears. Hence, according to various embodiments, the secondary function associated with the third function and/or the fourth function may skip at least 1 gear.

As a security feature, it may be beneficial to restrict operation of auxiliary paddle shifters 205 and 210 to times when the primary paddle shifters 105 and 110 are engaged in concert with the auxiliary paddle shifters 205 and 210. In this way, unintentional engagement of the auxiliary paddle shifters 205 and 210 may be reduced.

The first and third locations may be adjacent. Similarly, the second and fourth locations may be adjacent. Moreover, when the primary paddle shifters 105 and 110 and the auxiliary paddle shifters 205 and 210 are in the idle position they may be adjacent and/or positioned along the same plane. In various embodiments, the primary paddle shifters 105 and 110 may be larger than the auxiliary paddle shifters 205 and 210. According to various embodiments, the combination of the primary paddle shifters 105 and 110 and the auxiliary paddle shifters 205 and 210 may span about the same footprint as a traditional conventional paddle shifter having only a primary function.

Figure 3:
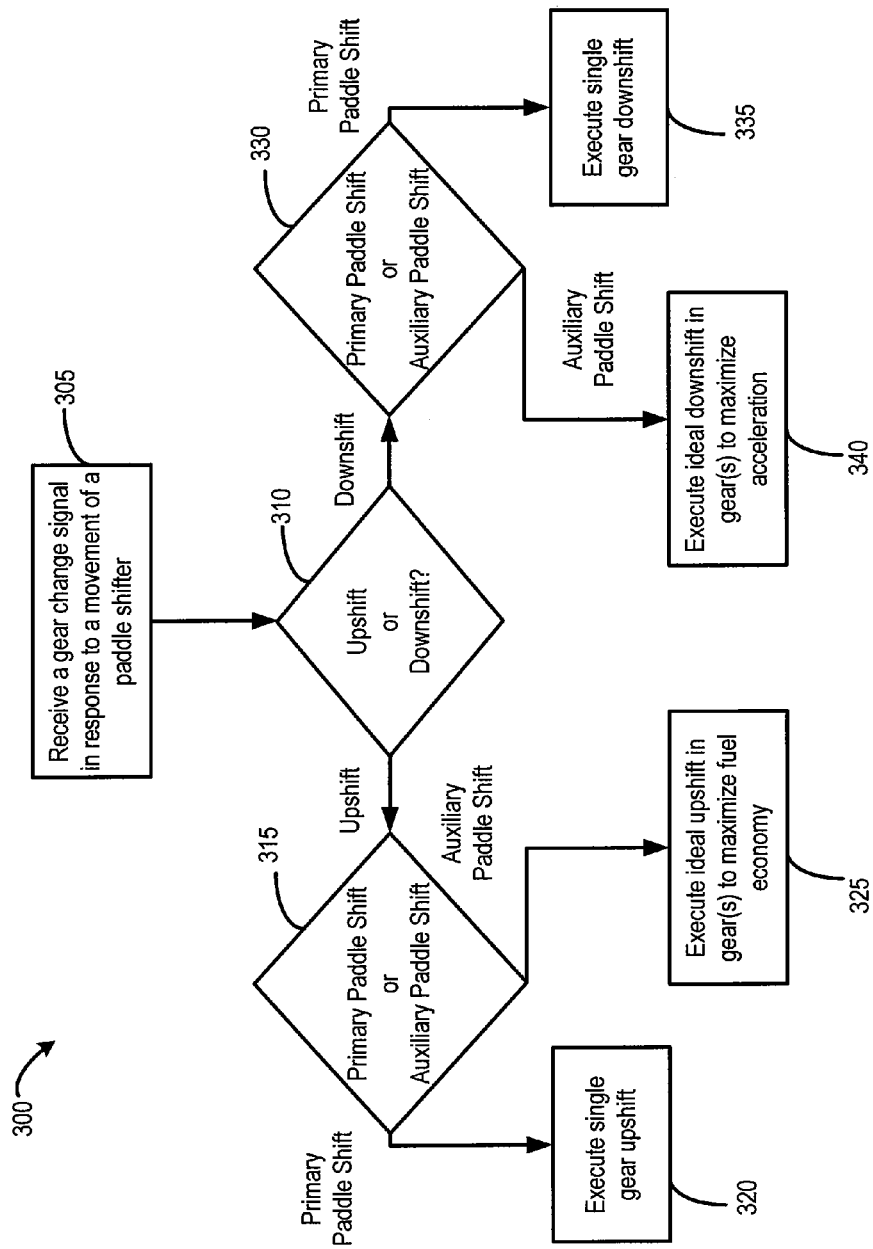
FIG. 3 depicts a flow chart showing a method of optimizing gear changes in a vehicle using paddle shifters according to various embodiments.
Figure 4:
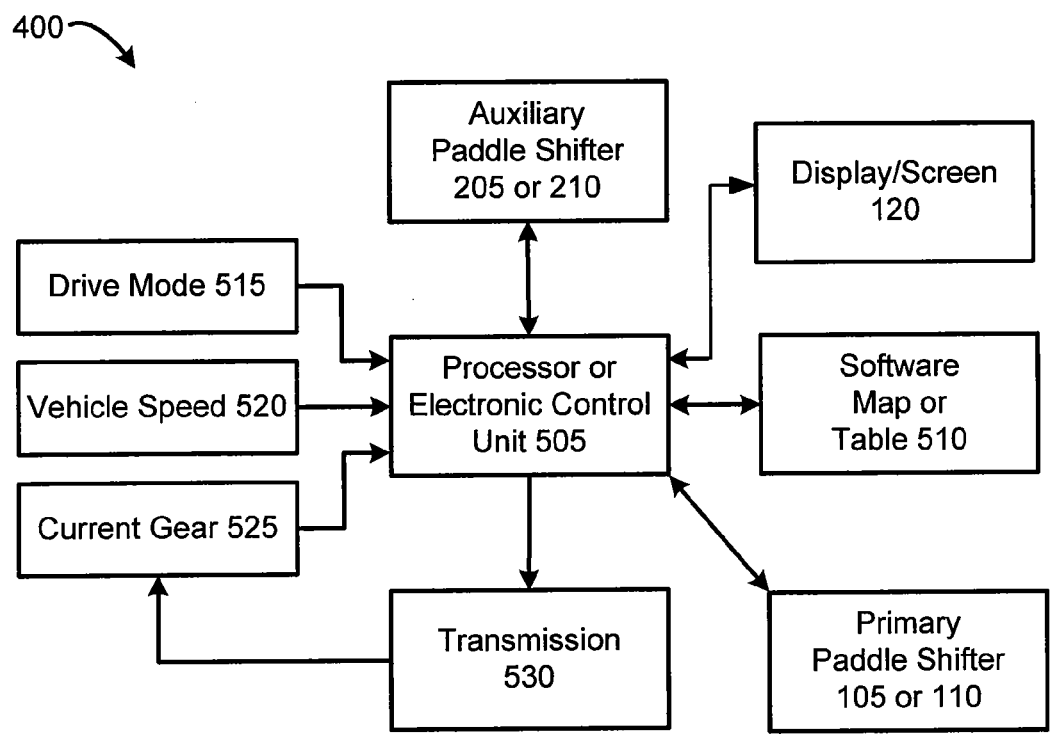
FIG. 4 is an exemplary system for executing the method described in FIG. 3 according to various embodiments.
Figure 5:
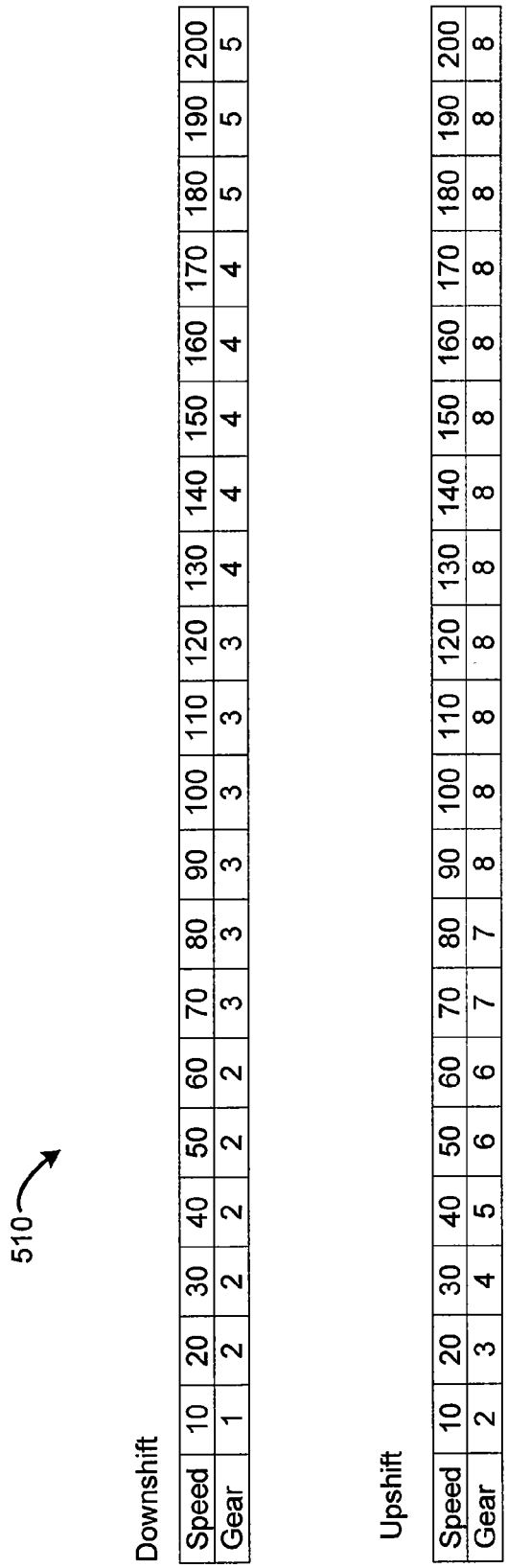
FIG. 5 is an exemplary software map according to various embodiments.

FIG. 3 depicts a flow chart 300 showing a method of optimizing gear changes in a vehicle using paddle shifters according to various embodiments. FIG. 4 is an exemplary system 400 for executing the method described in FIG. 3 according to various embodiments. The system 400 includes the primary paddle shifters 105 and 110, the auxiliary paddle shifters 205 and 210, a processor or electronic control unit (ECU) 505, a memory, a software map or table 510, a screen 120, a drive mode 515, a vehicle speed 520, a current gear 525, and a transmission 530. The system 400 may include other vehicle components but have been omitted to avoid unnecessary descriptions. At step 305, the processor 505 receives a gear change signal in response to a movement of a primary paddle shifter 105 or 110 and/or an auxiliary paddle shifter 205 or 210. The processor 505 determines whether the upshift paddle shifter or the downshift motion (location) was activated based on the gear change signal (step 310). Thereafter, the processor 505 determines which paddle shifter was moved, an auxiliary paddle shifter 205 and 210 or a primary paddle shifter 105 and 110, based on the gear change signal (step 315 or 330). If the primary paddle shifter 105 or 110 was moved to the first or second location, the processor 505 commands the transmission 530 to execute a single gear upshift (step 320) or a single gear downshift (step 335). If the auxiliary paddle shifter 205 or 210 was moved to the third or fourth position, the processor 505 commands the transmission 530 to execute a secondary function, such as an ideal or optimal gear upshift (step 325) to maximize fuel economy or an ideal or optimal gear downshift (step 340) to maximize acceleration or performance. To determine the ideal or optimal gear upshift or downshift, the processor 505 may utilize information such as the drive mode 515, the vehicle speed 520, the current gear 525, a user's custom table of gear changes and/or a software map or table 510 that provides a listing of the optimal gear based on the vehicle speed and/or whether the vehicle is upshifting or downshifting. FIG. 5 is an exemplary software map 510. The secondary function may be activated at any suitable time.

Furthermore, in response to activating the secondary function via the auxiliary paddle shifter 205 and 210, an audio warning and/or a visual warning such as an indication on screen 120 may be communicated. In an example, the red light illuminating box may flash in response to the auxiliary paddle shifter 205 and 210 being engaged. In an example, pushing or pulling the auxiliary paddle shifters 205 and 210 may result in feedback from a haptic response system, such as vibration of the auxiliary paddle shifters 205 and 210 (or vibration of the driver's seat) to communicate to a user that the auxiliary paddle shifters 205 and 210 secondary function, (e.g., an optimal gear shift) has been activated. According to various embodiments, pushing or pulling the auxiliary paddle shifters 205 and 210 may result in mechanical feedback to communicate to a user that the secondary function has been activated. According to various embodiments, a warning or indicator may also be used to indicate when the secondary function cannot be executed and the primary function is executed instead.

The secondary function has been described as an optimal gear change according to a prescribed table; however, the secondary function can be any suitable secondary function. For instance, the secondary function may be a customizable gear change. For instance, a user and/or vehicle operator may store a personalized gear change map and/or table based on their driver's tastes and preferences. This personalized gear change may not be an optimal gear shift but may be a gear shift in accordance with the operator's desires. This gear shift in accordance with the user's desires may be enacted via referencing a complete table of gears to shift to from the current gear based on a current vehicle speed or a preferred gear to shift to from the current gear.

According to various embodiments, the secondary function may be a customizable gear change based on a driving condition and/or an environmental condition. For instance, downshifting with the auxiliary paddle shifter 205 and 210 may allow an increase in engine braking when going down steep or long hills. In advance of a steep decline, a driver may engage the auxiliary paddle shifter 205 or 210 to prepare for engine braking. In advance of a steep incline, a driver may engage the auxiliary paddle shifter 205 or 210 to provide more power when climbing uphill. According to various embodiments, the secondary function may be a customizable gear change such as a series of downshifts before entering a sharp turn and/or a series of upshifts as one exits a sharp turn. According to various embodiments, the secondary function may be preferred gear changes for driving in environmental conditions such as deep snow or on a slippery surface (e.g., a wet road and/or an icy road). According to various embodiments, the secondary function may be a series of gear changes with a set time delay between each change. This series could be sequentially up, sequentially down or a gear change up and then a gear change down or vice versa such as when a driver is passing or cornering their vehicle.

Those of ordinary skill will appreciate that the secondary function has been described as being accessed by a mechanical movement of the auxiliary paddle shifter 205 or 210. It should be appreciated that this secondary function may be deactivated such as by reprogramming, such as via an interface with the ECU. In this embodiment, the auxiliary paddle shifters 205 and 210 may be programmed to operate the same as the primary paddle shifters 105 and 110. It should also be appreciated that this secondary function may be achieved by reprogramming, such as via an interface with the ECU, the primary function of the primary paddle shifters 105 and 110. Thus, according to various embodiments, a secondary function may be achieved without engaging the auxiliary paddle shifters 205 and 210, but rather by moving the primary paddle shifters 105 and 110. Moreover, other implementations, mechanical and/or electrical may be used to achieve the secondary function. Such as through use of a switch (not shown).

For example, a switch or button 115 located on the steering wheel 100 (or instrument panel, steering column, steering wheel, paddle shifter 105, 110 or center console) may be used to toggle the functionality of the primary paddle shifters 105 and 110 from a primary function to a secondary function. The switch 115 may be a digital switch that can be actuated using the vehicle's information or entertainment system. In response to the switch being depressed or selected, the primary paddle shifters 105 and 110 are activated and the display screen 120 with an indicator, such as an illuminated and/or colored indicator, to indicate that the primary paddle shifters 105 and 110 are set to either the primary function or the secondary function.

According to various embodiments, in response to the switch 115 being depressed or selected, the paddle shifters 105 and 110 are activated and the display screen 120 highlights the secondary function and is activated such as an illuminated and/or colored indicator (e.g., a green indicator). In response to the switch 115 being depressed or toggled again, the secondary function of the primary paddle shifters 105 and 110 may be deactivated and the display screen 120 with an indicator, such as an illuminated and/or colored indicator (e.g., a red indicator) may indicate that the secondary function of the primary paddle shifters 105 and 110 is deactivated. According to various embodiments, pushing and/or pulling paddle shifters 105, 110, 205, and 210 substantially simultaneously with pushing and/or pulling the another paddle shifter 105, 110, 205, and 210 may effect another functionality. For example, this functionality may be disabling/enabling of the auxiliary paddle shifters 205 and 210. This functionality may be a cancel of the most recent received gear shift command either from any paddle shifter 105, 110, 205, and 210.

According to various embodiments, a software timer may be used to execute a secondary function when actuating one or more paddle shifters 105, 110, 205 and 210. The software timer function may be different than or the same as the secondary function achieved via operation of auxiliary paddle shifters 205 and 210, but preferably will be different than the secondary function achieved via operation of auxiliary paddle shifters 205 and 210. The secondary function may be any secondary function described herein, such as an optimal gear change, a customizable gear change, a cancellation of a command, locking out functionality, engaging functionality and/or the like. For instance, in response to one or more paddle shifters 105, 110, 205 and 210 being moved to a position, a timer may be started. If the one or more paddle shifters 105, 110, 205 and 210 remains actuated (e.g., held in position and/or not released to return to the idle position) longer than a threshold and/or until the timer expires, a secondary function may be executed. If the one or more paddle shifters 105, 110, 205 and 210 is released before the threshold is reached and/or the timer does not expire, the secondary function is not executed. According to various embodiments, this secondary function may be achieved if a combination, such as any combination of paddle shifters 105, 110, 205 and 210 are actuated together for longer than a threshold and/or until the timer expires. According to various embodiments, this embodiment may be practiced on systems having only primary paddle shifters 105 and 110 such as a system with no auxiliary paddle shifters 205 and 210. According to various embodiments, this timer threshold may be set such that the primary function is inhibited until after the release of the one or more paddle shifters 105, 110, 205 and 210 and/or the timer expires so that either the primary function or a secondary function is executed. According to various embodiments, the software may be calibrated to determine whether a primary function is executed upon actuation of a paddle shifter 105, 110, 205 and 210 to a function location (first location, second location, third location, fourth location) or upon timer interruption. According to various embodiments, the duration of the timer (setting the threshold) may be selectable based on various preset values. According to various embodiments, the duration of the timer (setting the threshold) may be customizable based on user preferences. For instance, a user may store in the memory or system, the desired duration of the timer. This storage may be an entered time via an interface, via feedback, via a practice actuation and/or the like.

Those of ordinary skill will appreciate that the various illustrative logical blocks and process steps described in connection with the examples disclosed herein may be implemented as electronic hardware, computer software, or combinations of both. Whether such functionality is implemented as hardware or software depends upon the particular application and design constraints imposed on the overall system. Ordinarily, skilled artisans may implement the described functionality in varying ways for each particular application, but such implementation decisions should not be interpreted as causing a departure from the scope of the disclosed apparatus and methods.

Systems, methods and computer program products are provided. References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The storage medium may be integral to the processor. The computational steps disclosed herein may be comprised in an article of manufacture including a non-transitory, tangible computer readable storage medium having instructions stored thereon.

The foregoing description of the disclosed example embodiments is provided to enable any person of ordinary skill in the art to make or use the present invention. Various modifications to these examples will be readily apparent to those of ordinary skill in the art, and the principles disclosed herein may be applied to other examples without departing from the spirit or scope of the present invention. The described embodiments are to be considered in all respects only as illustrative and not restrictive and the scope of the invention is, therefore, indicated by the following claims rather than by the foregoing description. All changes which come within the meaning and range of equivalency of the claims are to be embraced within their scope.

What is claimed is:

1. A system for controlling gear changes of a transmission in a vehicle, the system comprising:
   a steering wheel;
   a first paddle shifter coupled to the steering wheel and configured to generate a first signal and a second signal;
   a second paddle shifter coupled to the steering wheel and configured to generate a third signal and a fourth signal; and
   a processor configured to:
      instruct the transmission to perform a single gear up-shift in response to receiving the first signal,
      instruct the transmission to perform a single gear down-shift in response to receiving the second signal,
      instruct the transmission to perform a multiple gear up-shift in response to receiving the third signal, and
      instruct the transmission to perform a multiple gear down-shift in response to receiving the fourth signal.

2. The system of claim 1, wherein
   the first paddle shifter is configured to be positioned in a first idle location, a first location and a second location, such that the first paddle shifter generates the first signal in response to being positioned in the first location and generates the second signal in response to being positioned in the second location; and
   the second paddle shifter is configured to be positioned in a second idle location, a third location and a fourth location, such that the second paddle shifter generates the third signal in response to being positioned in the third location and generates the fourth signal in response to being positioned in the fourth location.

3. The system of claim 2, wherein
   moving the second paddle shifter from the second idle location to at least one of the third location or the fourth location requires a different amount of force than moving the first paddle shifter from the first idle location to least one of the first location or the second location.

4. The system of claim 1, further comprising an interface for transmitting a customized gear shift operation to be performed in response to the processor receiving the third signal or the fourth signal.

5. The system of claim 1, wherein at least one of the multiple gear up-shift or the multiple gear down-shift is an optimal gear change.

6. The system of claim 5, wherein the processor is further configured to determine the optimal gear change based on a software map.

7. The system of claim 6, wherein the software map takes into account at least one of a vehicle drive mode, a vehicle speed, or a current gear.

8. The system of claim 1, wherein at least one of the multiple gear up-shift or the multiple gear down-shift is a user selected customized gear change.

9. The system of claim 1, wherein at least one of the multiple gear up-shift and the multiple gear down-shift is a user selected customized gear change based on at least one of a driving condition or an environmental condition.

10. A system for controlling gear changes of a transmission in a vehicle, the system comprising:
    a steering wheel;
    a first paddle shifter coupled to the steering wheel and configured to generate a first signal and a second signal;
    a second paddle shifter coupled to the steering wheel and configured to generate a third signal and a fourth signal; and
    a processor configured to:
       instruct the transmission to perform a single gear up-shift in response to receiving the first signal,
       instruct the transmission to perform a multiple gear up-shift in response to receiving the second signal,
       instruct the transmission to perform a single gear down-shift in response to receiving the third signal, and instruct the transmission to perform a multiple gear down-shift in response to receiving the fourth signal.

11. The system of claim 10, wherein:
the first paddle shifter is configured to be positioned in a first idle location, a first location and a second location, such that the first paddle shifter generates the first signal in response to being positioned in the first location and generates the second signal in response to being positioned in the second location; and
the second paddle shifter is configured to be positioned in a second idle location, a third location and a fourth location, such that the second paddle shifter generates the third signal in response to being positioned in the third location and generates the fourth signal in response to being positioned in the fourth location.

12. The system of claim 11, wherein a different amount of force is required to move the first paddle shifter from the first idle location to the first location than to move the first paddle shifter from the first idle location to the second location.

13. The system of claim 10, wherein at least one of the multiple gear up-shift or the multiple gear down-shift is an optimal gear change.

14. The system of claim 13, wherein the processor is further configured to determine the optimal gear change based on a software map.

15. A system for controlling gear changes of a transmission in a vehicle, the system comprising:
a steering wheel;
a first paddle shifter coupled to the steering wheel and configured to generate a first signal;
a second paddle shifter coupled to the steering wheel and configured to generate a second signal;
a third paddle shifter coupled to the steering wheel and configured to generate a third signal;
a fourth paddle shifter coupled to the steering wheel and configured to generate a fourth signal; and
a processor configured to:
instruct the transmission to perform a single gear up-shift in response to receiving the first signal,
instruct the transmission to perform a single gear down-shift in response to receiving the second signal,
instruct the transmission to perform a multiple gear up-shift in response to receiving the third signal, and
instruct the transmission to perform a multiple gear down-shift in response to receiving the fourth signal.

16. The system of claim 15, wherein:
the first paddle shifter is configured to be positioned in a first idle location and a first location such that the first paddle shifter generates the first signal in response to being positioned in the first location;
the second paddle shifter is configured to be positioned in a second idle location and a second location such that the second paddle shifter generates the second signal in response to being positioned in the second location;
the third paddle shifter is configured to be positioned in a third idle location and a third location such that the third paddle shifter generates the third signal in response to being positioned in the third location; and
the fourth paddle shifter is configured to be positioned in a fourth idle location and a fourth location such that the fourth paddle shifter generates the fourth signal in response to being positioned in the fourth location.

17. The system of claim 16, wherein a different amount of force is required to move the first paddle shifter from the first idle location to the first location than to move the third paddle shifter from the third idle location to the third location.

18. The system of claim 15, wherein at least one of the multiple gear up-shift or the multiple gear down-shift is an optimal gear change.

19. The system of claim 18, wherein the processor is further configured to determine the optimal gear change based on a software map.

20. The system of claim 19, wherein the software map takes into account at least one of a vehicle drive mode, a vehicle speed, or a current gear.

* * * * *